(No Model.)
F. FELTGEN.
NUT LOCK.
No. 601,463. Patented Mar. 29, 1898.
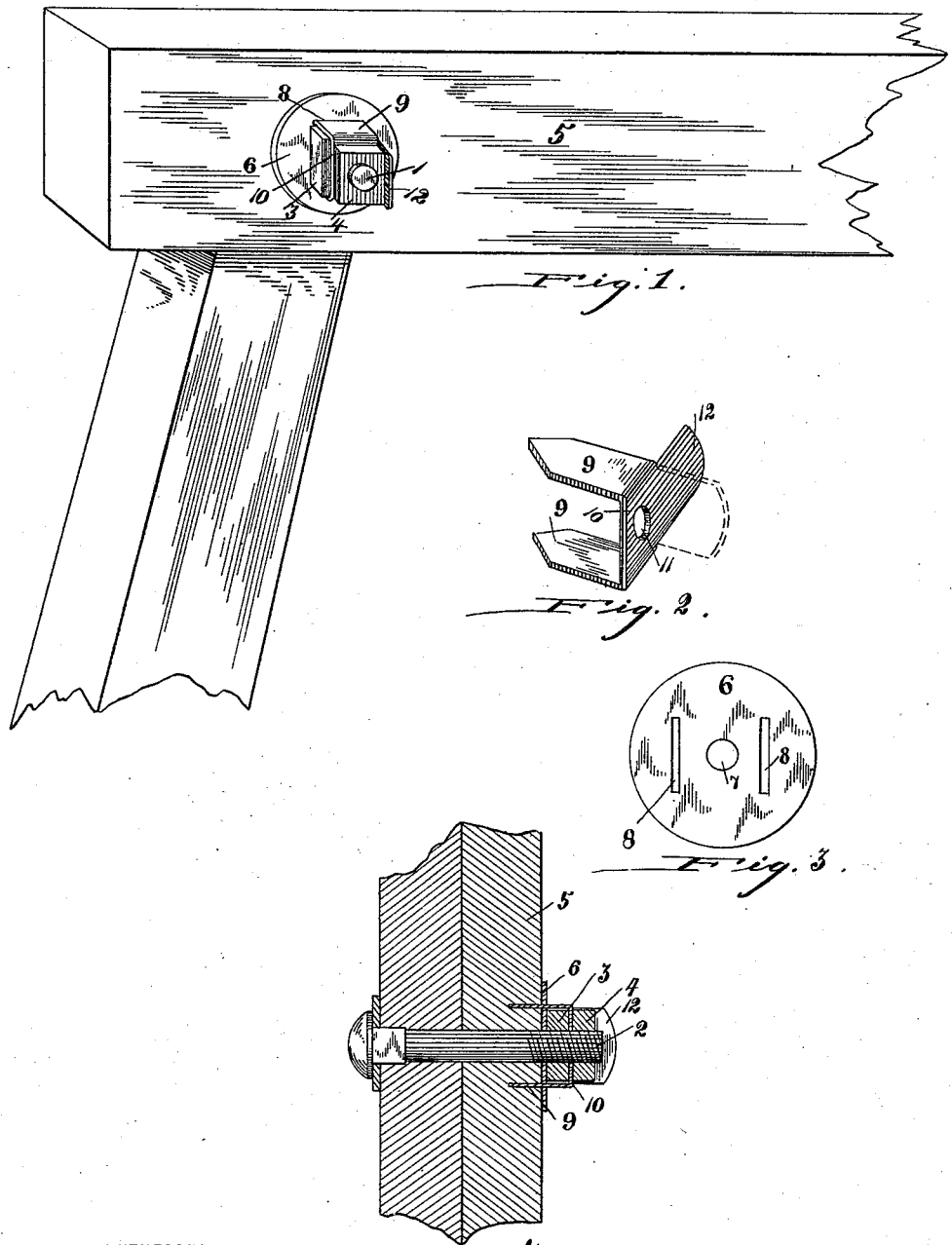

UNITED STATES PATENT OFFICE.

FRANK FELTGEN, OF PITTSBURG, PENNSYLVANIA.

NUT-LOCK.

SPECIFICATION forming part of Letters Patent No. 601,463, dated March 29, 1898.

Application filed January 22, 1898. Serial No. 667,528. (No model.)

*To all whom it may concern:*

Be it known that I, FRANK FELTGEN, a citizen of the United States of America, residing at Pittsburg, in the county of Allegheny and State of Pennsylvania, have invented certain new and useful Improvements in Nut-Locks, of which the following is a specification, reference being had therein to the accompanying drawings.

This invention relates to certain new and useful improvements in nut-locks, and is specially adapted for use on trestle and bridge work, although the lock may be advantageously employed in various other connections.

The principal features of my invention comprise a U-shaped washer or clamp which is adapted to engage over the jam-nut, and the two projecting arms of which are adapted to extend through slots provided therefor in the washer interposed between the jam-nut and the stringer or other device through which the bolt passes, the said arms engaging into the said stringer or device and thereby preventing the U-shaped washer or clamp from turning. This U-shaped washer or clamp also carries an outwardly-extending portion, which after the outer nut has been placed on the bolt is turned upwardly or outwardly, so as to lie in close proximity with the one edge of the nut and prevent the same from turning. These features will all be hereinafter more specifically described, and particularly pointed out in the claims.

In describing the invention in detail reference is had to the accompanying drawings, forming a part of this specification, and wherein like figures of reference indicate similar parts throughout the several views, in which—

Figure 1 is a perspective view of a portion of the trestle, showing my improved nut-lock in position. Fig. 2 is a perspective view of the U-shaped washer or clamp. Fig. 3 is a plan view of the slotted washer, which is arranged between the jam-nut and the device through which the bolt passes. Fig. 4 is a vertical sectional view showing my improved nut-lock applied to a bolt.

Referring now to the drawings by reference-figures, 1 denotes the bolt, which is or may be of the ordinary construction, having a screw-threaded end 2 to receive the jam-nut 3 and the outer nut 4. Interposed between the stringer 5 or other object through which the bolt 1 passes and the aforesaid jam-nut 3 is a washer 6, which is provided at two sides of the central aperture 7, which receives the bolt 1, with oblong slots 8. These oblong slots 8 are adapted to receive the projecting and pointed arms 9 of the U-shaped washer 10, which is provided with an aperture 11 for the reception of the bolt 1, the said projecting and pointed arms 9 being adapted to be driven or otherwise forced firmly into the stringer 5. If desired, the slots may be formed in the stringer for the reception of these projecting arms or barbs 9. The U-shaped washer is also provided with an outwardly-extending portion 12, which before bending extends at right angles to the barbs 9, but which after the outer nut 4 has been placed in its position on the bolt is adapted to be bent outwardly against the one edge of the nut and is therefore extended in the same direction as the pointed barbs 9. To remove the lock, this extending portion 12 is again bent at right angles to the projecting barbs 9, which permits the removal of the outer nut 4, after which the U-shaped washer or clamp may be removed and the jam-nut then unscrewed from its position on the bolt.

When the nut-lock is employed on metal structures, it will be necessary to provide the slots in the beam or stringer for the projecting barbs 9.

While the foregoing seems to embody the preferable form of my invention, yet I do not wish to limit myself to this exact construction, as various changes may be made in the details of construction without departing from the general spirit of my invention.

Having fully described my invention, what I claim as new, and desire to secure by Letters Patent, is—

1. In combination, a bolt, a U-shaped washer, and a washer which is provided with oblong slots to receive the projecting arms of said U-shaped washer, the latter being provided with a projecting portion which is adapted to be bent against the outer nut of the bolt, substantially as shown and described.

2. A nut-lock comprising in combination with a bolt, a jam-nut at the outer end, and a U-shaped washer engaging the bolt and the projecting arms of which pass through a solid washer interposed between the jam-nut and the material through which the bolt passes, said U-shaped washer having a projecting portion that is adapted to be bent outwardly to prevent the turning of the outer nut, substantially as shown and described.

In testimony whereof I affix my signature in the presence of two witnesses.

FRANK FELTGEN.

Witnesses:
JOHN NOLAND,
GEO. B. PARKER.